July 8, 1924.
A. CAMPODONICO
1,500,798
DENTAL INSTRUMENT AND MIRROR
Filed April 12, 1924
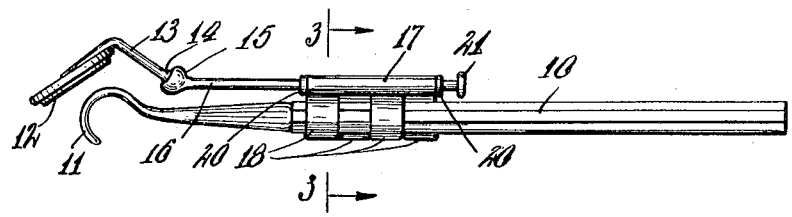
FIG. 1
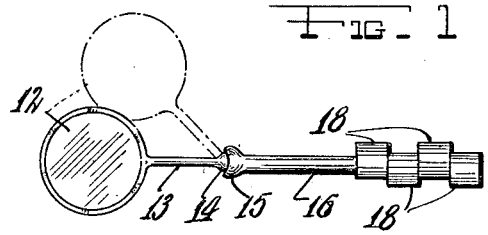 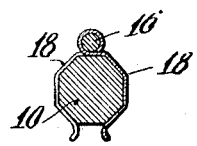
FIG. 2 FIG. 3
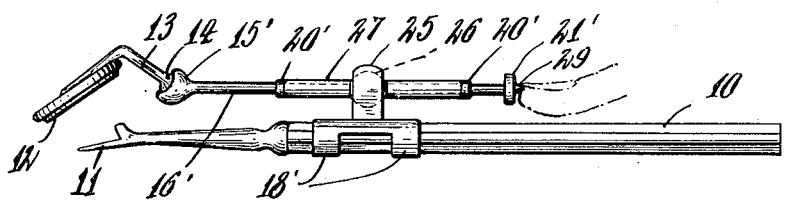
FIG. 4
*INVENTOR*
Alcibiades Campodonico
*BY*
*ATTORNEY*

Patented July 8, 1924.

1,500,798

UNITED STATES PATENT OFFICE.

ALCIBIADES CAMPODONICO, OF LIMA, PERU.

DENTAL INSTRUMENT AND MIRROR.

Application filed April 12, 1924. Serial No. 706,102.

*To all whom it may concern:*

Be it known that I, ALCIBIADES CAMPODONICO, a citizen of Peru, residing at Lima, in the Republic of Peru, South America, have invented certain new and useful Improvements in Dental Instruments and Mirrors, of which the following is a specification.

This invention relates generally to dental instruments for hand use, such as are used in preparing the cavities in teeth for filling, the invention relating to a dental mirror combined with an instrument of this type.

The invention has for an object the provision of a novel instrument which comprises the drill or pick, and a mirror mounted thereon for viewing the tooth being operated on, the mirror being preferably removable to permit of application to any one of a number of like instruments, a further object of the invention relating to the provision of means for varying the position of the mirror with respect to the point of the instrument.

For further comprehension of the invention, and of the objects and advantages thereof, reference will be had to the following description and accompanying drawing, and to the appended claims in which the various novel features of the invention are more particularly set forth.

Fig. 1 of the drawing is a side view showing a dental instrument with the mirror mounted thereon according to my invention.

Fig. 2 is a face view of the mirror removed from the instrument.

Fig. 3 is a transverse sectional view taken on the line 3—3 of Fig. 1.

Fig. 4 is a similar view to Fig. 1 but showing a modified construction.

Referring to Fig. 1 of the drawing, the reference numeral 10 indicates the shank of an ordinary dental instrument adapted for hand use, and having a cutting end 11. The mirror which is adapted for mounting on this shank comprises the mirror proper 12 which is of the size and circular shape common with dental mirrors, and which is fixed on one end of an arm 13 having a ball 14 on its other end, the plane of the mirror being inclined to the arm as shown for reflection of the light rays in the proper direction. This mirror is located adjacent the point of the tool in such position as to permit of the dentist viewing the tooth being worked on.

The ball 14 on the end of the arm engages in a socket 15 on one end which I may term the forward end, of a rod 16 having its opposite end engaged with a clip member 17 adapted to grip the shank of the instrument, the arm 13 and rod 16 being of such length that the clip engages the shank of the instrument toward the front end thereof. The clip is here shown as comprised of a piece of sheet metal cut out on opposite sides to form a pair of fingers 18 on each side thereof, the fingers on the respective sides of the clip being staggered with respect to one another, and the pair of fingers on each side being spaced apart from one another a distance equal to or slightly greater than the width of the fingers. The clip 17 is engaged with the rod 16 by bending its central portion around the said rod to frictionally grip the latter, the fingers on opposite sides passing between one another and being suitably curved to grip the shank of the instrument as shown in Fig. 3. To facilitate adjustment of the mirror without withdrawing the instrument from the mouth of the patient, a pair of collars 20 may be fixed to the rod 16 one at each end of the clip 17, while the rod may project at its rear and beyond the clip and may be provided with a knurled head 21 for rotating purposes, it being understood that the frictional grip of the clip on the rod, while being sufficient to prevent the mirror from accidently moving will not be sufficient to prevent ready rotation of the rod.

In the form of the invention shown in Fig. 4 the clip 17' may be in the form of a piece of sheet metal having juxtaposed fingers such as 18' formed on opposite sides thereof and it has fixed to the back thereof a socket element 25 in which is frictionally engaged a ball 26 fixed on a hollow rod or tube 27 between the ends of said tube. Through this tube a rod 16' extends from end to end, and is frictionally engaged therewith the rod being longer than the tube and projecting at both ends from the latter, a pair of collars 20' being fixed on the rod at opposite ends of the tube to prevent longitudinal movement of the rod in the tube. On the forward end of this rod a spherical socket 15' is mounted and frictionally receives the ball 14 on the end of the arm 13 which carries the mirror 12. The rear end of the rod has a head 21' thereon for purposes of rotation, while a cone-like element 29 is formed on the end of this head and is adapted to be engaged by the finger of the dentist, as indicated in dotted lines, when the tube 27 is to be swung on its universal joint 25, 26 to vary the position of the mirror with respect to the point of the instrument. With this arrangement a wider adjustment of the mirror can be obtained without withdrawing the instrument from the mouth of the patient.

Having thus described my invention what I claim as new and desire to protect by Letters Patent of the United States is as follows:

1. A device of the class described comprising a mirror, an arm on which said mirror is fixed, a support for said arm adapted to engage the shank of a dental instrument, and a ball and socket connection between said arm and its support.

2. A device of the class described comprising a mirror, an arm on which said mirror is fixed, a rod for supporting said arm, a ball and socket connection beween said arm and said rod, a clip adapted to engage the shank of a dental instrument to support the said rod, said rod being frictionally engaged with said clip to permit of rotation of the rod.

3. A device of the class described comprising a clip adapted to engage the shank of a dental instrument, a socket element fixed to said clip, a tube having a ball thereon between its ends frictionally engaged in said socket, a rod extending through said tube and frictionally held against rotation therein, a mirror mounted on the forward end of said rod, and a head on the rear end of said rod.

4. A device of the class described comprising a clip adapted to engage the shank of a dental instrument, a socket element fixed to said clip, a tube having a ball thereon between its ends frictionally engaged in said socket, a rod extending through said tube and frictionally held against rotation therein, a mirror mounted on the forward end of said rod, and a head on the rear end of said rod, said head having a conical projection from the end thereof.

In testimony whereof I have affixed my signature.

ALCIBIADES CAMPODONICO.